United States Patent Office 3,447,222
Patented June 3, 1969

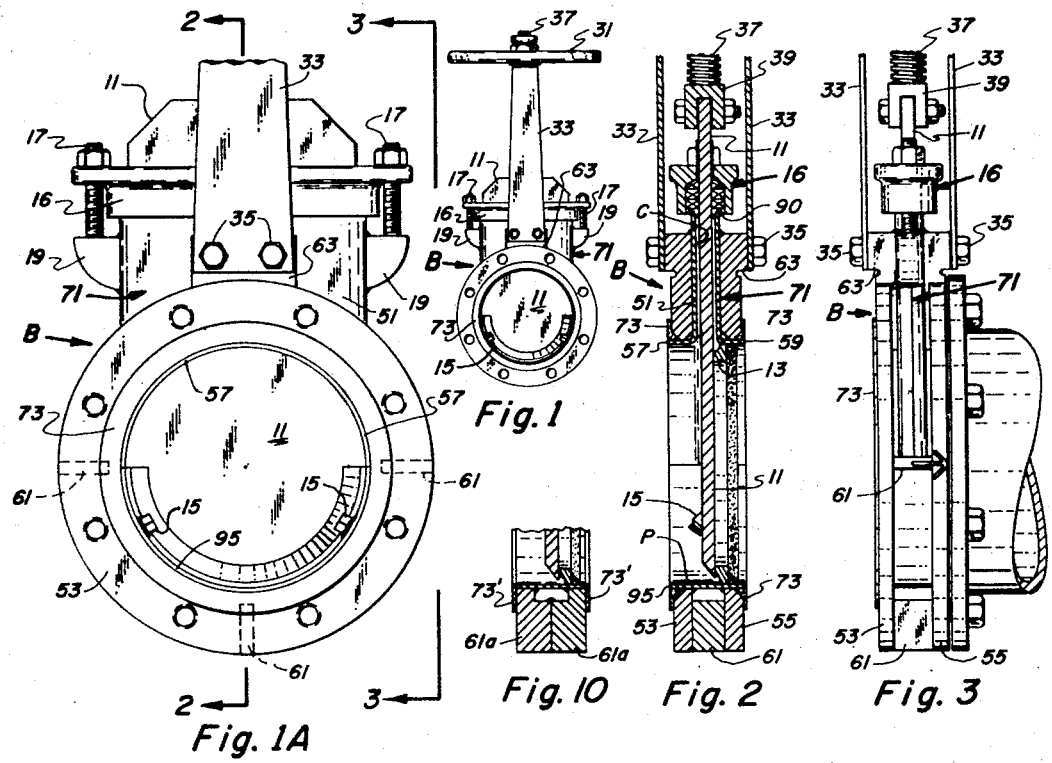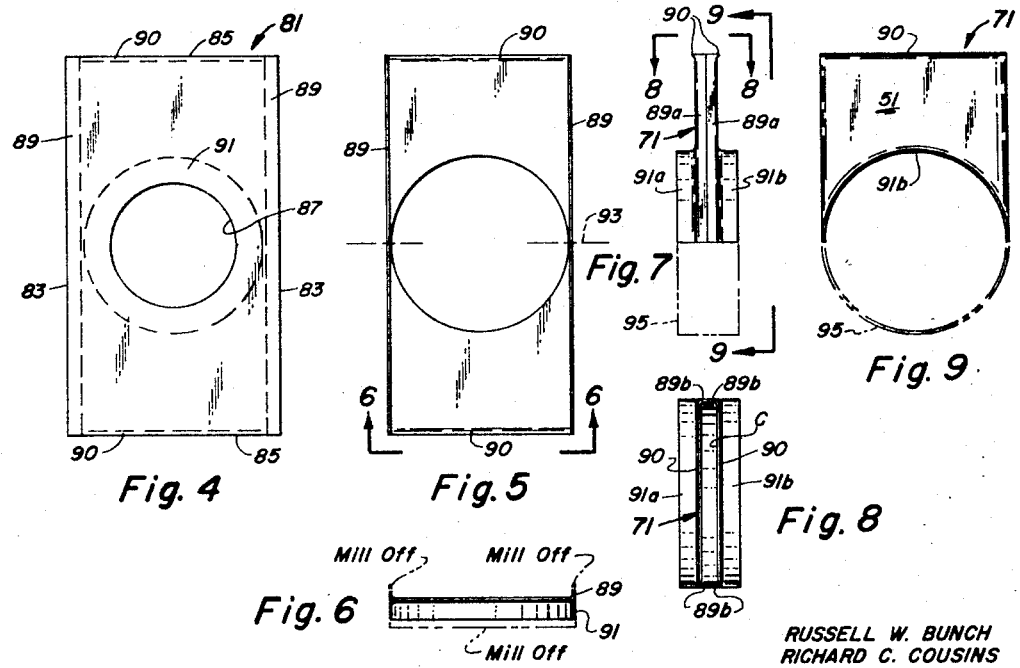

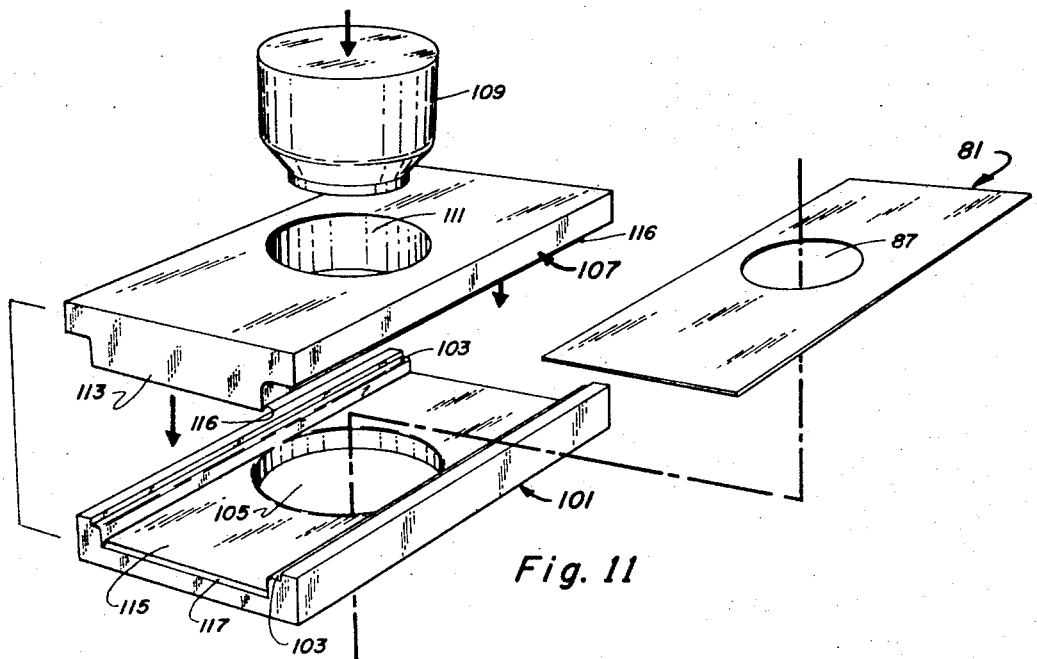
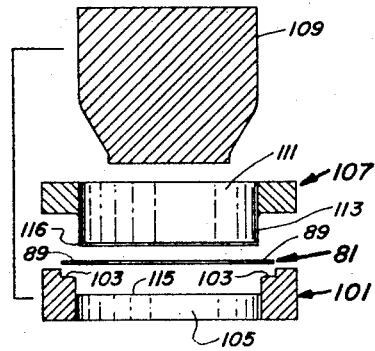
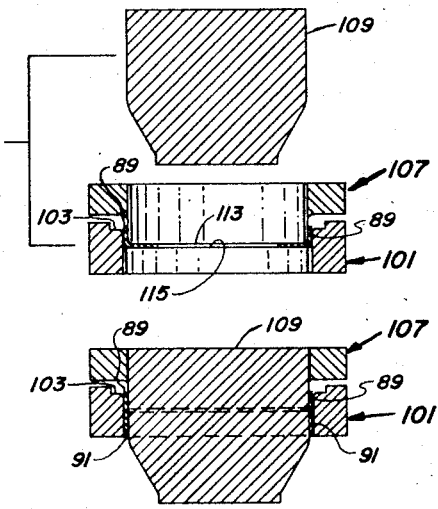
Fig. 11
Fig. 12
Fig. 13
Fig. 14
RUSSELL W. BUNCH
RICHARD C. COUSINS
INVENTORS
BY
BUCKHORN, BLORE, KLARQUIST & SPARKMAN
ATTORNEYS

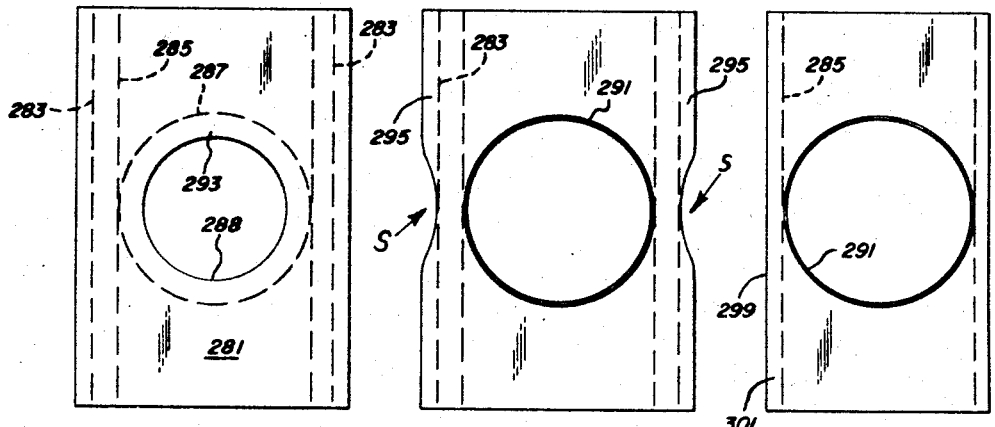
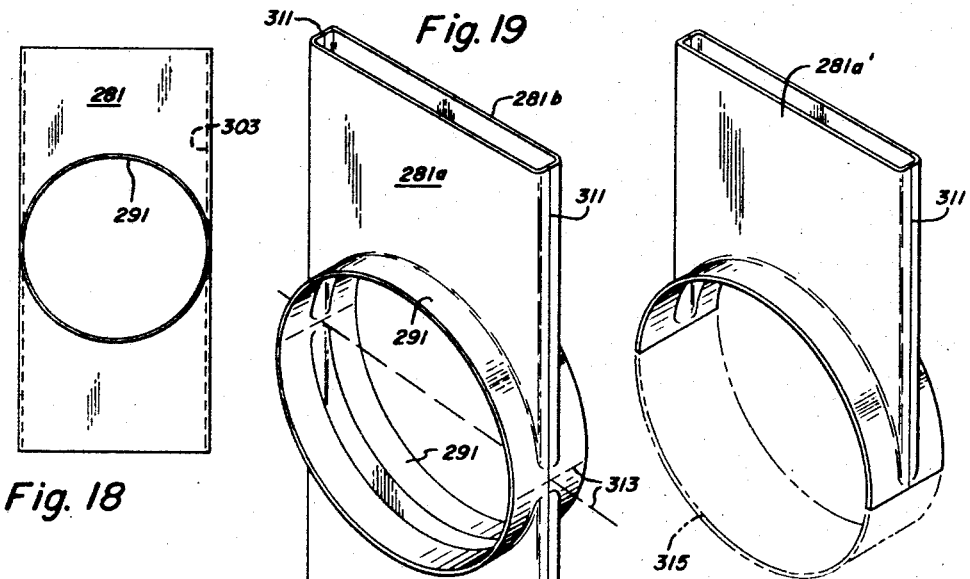
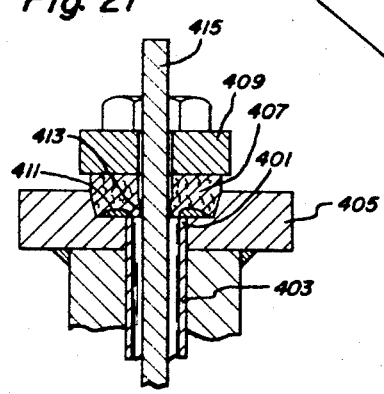

3,447,222
METHOD OF FABRICATING GATE VALVE
Russell W. Bunch and Richard C. Cousins, Portland, Oreg., assignors, by mesne assignments, to Dillingham Corporation, a corporation of Hawaii
Continuation-in-part of application Ser. No. 566,027, July 18, 1966. This application May 31, 1967, Ser. No. 648,525
Int. Cl. B21d *53/00;* B23p *15/00;* F16k *3/00*
U.S. Cl. 29—157.1          5 Claims

ABSTRACT OF THE DISCLOSURE

The method of fabricating the body shell of a blade type gate valve by performing certain pressing or blending operations on a flat metal blank in a manner to form two half body sections integrally joined together as mirror images of one another, and thereafter dividing the formed blank to separate the half body sections.

Cross references to related applications

This application contains all the subject matter in our prior application entitled "Fabricated Gate Valve and Method of Fabricating Same," Ser. No. 566,027, filed July 18, 1966, and now abandoned and benefit of the filing date of such earlier application in regard to the subject matter thereof is hereby claimed.

Additional subject matter has been added to the previously disclosed subject matter so that the present application is a continuation-in-part of said prior application.

Background of the invention

*Field of invention.*—This invention relates to methods of fabricating valve bodies from flat metal blanks whereafter the parts produced are welded together to form a valve body or valve body shell. The present invention particularly relates to the fabrication of the body shell of a blade type gate valve of the so-called wafer design.

Fabri-Valve Company of America, manufacturers a blade type gate valve for handling paper stock, wherein there is a body shell having a chest and tubular flow passage portions projecting away from the chest. The valve body is fabricated by welding together seven pieces, two chest plates, two chest spacer strips, a wide semicircular flow passage piece and two narrower semicircular flow passage pieces, located one on either side of the chest plates. This construction requires the formation of seven pieces and extensive welding operations to secure the pieces together.

Prior Art:

Among the prior art known to us are the patents to Groves 3,239,921, Allen 3,192,613, Williams 3,052,963 and Beurel 3,224,729 and the prior art references cited against these patents.

Summary of the invention

The method of the present invention comprises fabricating the body shell of a blade type gate valve by providing a rectangular blank in which a circular opening is formed and bending in one direction the margin around the opening to form a cylindrical flange, and bending the side margins in the opposite direction to form side flanges. Thereafter the blank is transversely divided through the cylindrical flange and the sections joined in flange-to-flange relation to provide a body part, or another formed blank is secured in flange-to-flange relation to the just-mentioned blank and the resulting hollow structure is divided transversely through the cylindrical flanges to provide a pair of body parts. A body part is completed by welding thereto a semi-cylindrical bottom member.

Brief description of the drawings

FIG. 1 is an end elevational view of a valve of our invention;
FIG. 1A is an enlarged fragmentary view of the lower portion of FIG. 1;
FIG. 2 is a vertical midsection taken along line 2—2 of FIG. 1A;
FIG. 3 is a side view of the valve taken in the direction of the arrows 3—3 of FIG. 1A;
FIG. 4 is a view of a blank or workpiece from which the major portion of the valve body member is fabricated;
FIG. 5 shows the blank after further operations have been performed thereon;
FIG. 6 is a view of the blank taken in the direction of the arrows 6—6 of FIG. 5;
FIG. 7 is a view showing a subsequent step in the fabrication of the valve body member;
FIG. 8 is a plan view of the structure shown in FIG. 7 taken in the direction of the arrows 8—8 of FIG. 7;
FIG. 9 is an end view of the structure disclosed in FIG. 7 taken in the direction of the arrows 9—9 of FIG. 7;
FIG. 10 is a fragmentary vertical section of a valve body of somewhat modified form;
FIG. 11 is an exploded perspective of a die apparatus for performing operations on the blank;
FIG. 12 is a transverse midsectional view through such die apparatus showing the blank or workpiece in position for operations to be performed thereon by the die apparatus;
FIGS. 13 and 14 show the die apparatus as having performed certain operations on the workpiece;
FIGS. 15–18 show a modified method of forming a worked blank;
FIGS. 19–20 show a modified method of forming body shells from worked blanks;
FIG. 21 is a fragmentary vertical sectional view of a modified form of valve that may be produced.

The method of the present invention will be explained after the structure of the valve has been described. Referring to FIGS. 1–3, the valve includes a valve body B into which a gate blade 11 projects. The blade seats against an annular seat 13 to close off a flow passage P provided by the body. Two wedge members 15 on the body urge the blade against the seat 13.

Above the body B, the blade 11 slidably extends through an inverted packing unit 16 like that in Reissue Patent 24,735, which unit is adjustably positioned on the body by bolts 17, the latter being mounted on lugs 19 secured to the body B.

The blade 11 is raised and lowered by the operation of a handwheel 31 which is rotatably supported in a known manner on a pair of upstanding arms 33, the lower ends of which are bolted at 35 to the body B. A threaded rising stem 37 is received by a nut (not shown) which is carried by the handwheel 31. The stem 37 is connected at its lower end by a clevis 39 to the upper end of the blade 11.

The body B includes a valve body member 51 on the opposite sides of which bolting flanges 53 and 55 are secured such as by welding. The flanges fit over tubular flow passage portions 57 and 59 of the valve body member 51, and the structure is reinforced by spacer blocks 61 (FIGS. 1, 2 and 3) which are welded to the flanges. The flanges have upstanding lug portions 63 to which the arms 33 are secured.

The valve body member 51 is of fabricated form and includes a chest portion 71 receiving the blade 11. The tubular flow passage portions 57 and 59 project from the opposite sides of the chest portion 71. A facing flange 73 is provided on the outer face of each of the bolting flanges and may be formed by depositing metal on the bolting flanges or may constitute an annular piece 73' (FIG. 10) welded to the associated bolting flange and tubular flow passage portion.

Various steps in the fabrication of the valve body member 71 are shown in FIGS. 4–9. A metal blank 81 is provided, and our method can make use of a simple, flat rectangular blank. This fact alone achieves a saving in cost over those constructions requiring a more complex blank form. The blank 81 has parallel side edges and parallel end edges 85. A hole 87 is formed centrally in the blank. Side marginal portions 89 (FIG. 4) of equal width are bent in one direction from the plane of the blank to form side flanges which are also identified by the reference numeral 89 (FIG. 5). End marginal portions 90 of the blank are bent in the opposite direction to form outwardly flaring lips (also identified by the reference numeral 90) to cooperate with the packing unit 16 (FIG. 2) to form a good seal therewith.

A circular marginal portion 91 (FIG. 4) around the hole 87 is bent from the plane of the blank in the opposite direction from the flanges 89 to form a circular flange (FIG. 6) which is also identified by the reference numeral 89. In practice, the free longitudinal edges of the side flanges 89 preferably are trimmed, such as by milling so that they are straight, and the free edge of the circular flange 91 is similarly trimmed to remove irregularities therein. In order to leave room for trimming, the flanges 89 and 91 should initially be made of a height greater than their final height.

It is pointed out that the dimensions of the flange portions 89 and 91 (FIG. 4) are chosen so that the inner diameter of the circular flange 91 is the same (or substantially the same) as the distance between the inner walls of the side flanges 89. The significance of this will appear hereinafter.

Now, the formed blank 81a is divided centrally in a direction transverse to the side flanges 89 (along the line 93, FIG. 5) to provide two body pieces having semicircular flange portions 91a and 91b and straight side flanges 89a and 89b (FIG. 7). These pieces are placed together in opposed relation with the side flange portions 89a and 89b thereof in abutting relation and with the semicircular flange portions 91a and 91b projecting outwardly. The side flange portions 89a and 89b are then welded together to provide a fabricated subassembly 92. A rolled semicircular piece 95 is placed against the lower ends of the fabricated subassembly and welded thereto to form the valve body member 71.

FIGS. 11–14 show a die apparatus in which the blank 81 having the hole 87 therein can be bent to form the side flanges 89 and the circular flange 91. The blank is placed in a female die 101 (FIG. 12) which has shoulders 103 upon which rest the marginal portions 89 of the blank. The female die has a circular opening 105 formed therein of the size shown.

The male die is in two parts, a lower part 107 and an upper part 109. The lower part has a circular opening 111 formed therein and has a central depending portion 113 which upon downward movement of the male part 107 presses the central portion of the blank downwardly against the central portion 115 of the female die 101 to form the side flanges 89. The male die part 107 also has depending transverse rib portions 116 of triangular cross section located at the ends of the male part, said rib portions cooperating with beveled end portions 117 of the central portion 115 to form the lips 90 on the blank 81.

Next the upper male part 109 of frustoconical form descends and presses outwardly the circular marginal portion 91 of the blank 81 to form the circular flange 91. Now the male die parts are elevated so that the formed blank can be removed. The blank at this time is in the form shown in FIG. 5. The blank is then divided and the thus formed half pieces joined as previously described.

Only so much of the die apparatus is disclosed as is necessary for an understanding of the operations which are performed on the blank 81, and connected related structure such as guide dowels for the die parts have not been shown.

FIG. 10 shows a modified form of bolting flange wherein instead of using spacer blocks 61, each flange is provided with plural integral spacer lugs 61a which are half the width of the blocks 61 and are welded together to provide the desired reinforcement.

FIG. 3 shows (in phantom lines) a flanged pipe section 120 bolted to the valve flange 55, it being understood that in practice there will be a similar flanged pipe section bolted to the valve flange 53.

It has previously been pointed out that the inner diameter of the circular flange 91 is made to be substantially equal to the distance between the inner faces of the side flanges 89. The reason for this is that with such a relationship, the cavity C (FIGS. 8 and 2) provided by the chest of the valve body merges smoothly into the flow passage P without the provision of pockets in which pulp stock can collect and cause the disadvantageous operating conditions well known to those skilled in the art. However, if our valve is to handle fluids other than paper stock, the circular flange 91 may be made small. In such case, closure pieces would have to be provided for the openings at the lower portion of the chest that would be left after a semicircular piece 95 of appropriate size was welded in place.

The formation of both the side flanges and the cylindrical flange of a blank in a double action press as shown in FIGS. 11–14 has one drawback. In pressing out the annular marginal portion 91, the surrounding metal is to some extent drawn or pulled inwardly. The closer proximity of the side edges 83 causes them to be drawn inwardly sufficiently to create recesses at such edges. This means that the side flanges thereafter formed will taper down in height at the center of the blank. When the flanges are thereafter abutted to form a body shell, a gap or crevice is formed at each side of the shell which must be filled in. This extra operation adds to the expense of fabricating the body shell.

FIGS. 15–17 shown a way to eliminate the above problem. The blank 281 in FIG. 15 is made extra oversize in width as indicated by the imaginary trim off lines 283 and bend lines 285 and 287. This blank is formed with a central hole 288, and the annular margin 293 around the hole 288 is pressed to form a cylindrical flange 291 (FIG. 16) with the aid of a male die 109, a plain holddown plate, and a simple female die like 115 but having no shoulder portions. This operation will usually inadvertently produce the recessed or "sucked in" edges S (FIG. 16), but these are eliminated by trimming off the side margins 295 defined by the lines 283 to leave straight side edges 299 as shown in FIG. 17. The marginal portions 301 in FIG. 17 are then bent to form the straight side flanges 303 (FIG. 18), the operation being carried out in a simple press brake having a V-grooved female die and a V-shaped male die. In fact, such a press brake can be used to form the side flanges of a range of sizes of valve body blanks, by differently locating the side margins of the blanks relative to the dies to obtain the desired height side flange. This can be accomplished with the aid of simple spaced strips, blocks or stops in the press to enable the selective (or same) location of the margins of blanks of the same or different widths. It is pointed out that only a few pairs of press brake dies are required for a standard press brake, in order to form the side flanges for a wide range of sizes of valves, the formation of the side flanges is inexpensively carried out.

An advantage of the method illustrated in FIGS. 15–17 is that the cost of the body dies for forming limited numbers of valves of a range of sizes is much less than that required for carrying out the method illustrated in FIGS. 11–14, because the formation of the side flanges on the bank in a standard press brake rather than in the body dies themselves means that body dies used in the FIGS. 15–17 method need have no shoulder portions as are necessary in FIGS. 11–14 and thus are simpler and less expensive.

Now, referring to FIGS. 5–9 for a moment, these figures shown that the worked blank of FIG. 5 is divided at line 93 and that the two halves are welded together by side seam welds as shown in FIG. 7. In manufacturing intermediate or smaller size valves, the length of the side seam welds is rather short. Welding many short seams is uneconomical as compared to welding longer seams. We have discovered a method, shown in FIGS. 19 and 20, whereby small valve body shells can be formed with long side seam welds.

In FIG. 19. two worked blanks 281a and 281b (like worked blank 281 in FIG. 18) are joined together by long side seams 311 to form a rather long hollow structure having oppositely extending cylindrical flanges 291. This hollow structure is then cut in two at lines 313 to provide two incomplete body shells like shell 281a' in FIG. 20, each being completed by the addition of a semicylindrical piece 315. Thus, even through the worked blanks 281a and 281b may be of small size, the side seam welds are twice as long as that used in FIGS. 5–9 method. The method of FIGS. 19–20 could obviously be used for forming valves of any size if desired.

It is pointed out that the method of FIGS. 19–20 could be utilized to form two body shells having chests of different heights by merely offsetting longitudinally the cylindrical flanges thereof.

The worked blank 281 in FIG. 18 has no bent end edges as are provided at 90 in FIG. 5. If these are to be formed, this can be done with crimping dies in a press brake just prior to forming the side flanges 303. However, if the blank is to be used to form a valve like that in FIG. 21, no crimping is required because in FIG. 21 the upper edges 401 of the valve body shell 403 are straight, rather than being bent as shown in FIG. 2. The packing utilized in FIG. 21 includes the heavy box flange 405 having a recess which receives packing 407 which is pressed down by a gland 409. A weld 411 joins the upper edges 401 of the shell to the flange 405 and its upward protrusion tends to assure good sealing contact of the lower inner corners 413 of the packing 407 with the blade 415.

Having described the invention in what is believed to be the preferred embodiment thereof, it is desired that it be understood that the invention is not to be limited other than by the provisions of the following claims.

We claim:

1. The method of fabricating a body shell of a gate valve of the type having a narrow flat chest portion within which a gate blade moves,
   and wherein there are tubular flow passage portions extending away from the chest portion in opposite directions,
   said method comprising providing a flat, rectangular metal blank having side and end edges,
   forming a circular opening in said blank intermediate the ends of the blank wherein the opening is located centrally between the side edges of said blank,
   performing an operation on the marginal portion of said blank which surrounds and defines said opening, wherein said operation comprises pressing such marginal portion in a direction normal to the plane of said blank to provide a cylindrical flange,
   bending equal width side marginal portions of said blank in the opposite direction away from the plane of said blank to form straight upstanding side flanges of substantially uniform height,
   dividing said blank transversely through the center of said cylindrical flange to provide two body members, each having a semicylindrical flange at one end,
   welding said body members together with said straight side flanges thereof in abutting relationship and with the semicircular flanges thereof extending away from each other whereby to provide a body part having a concave face at one end,
   providing a semicylindrical piece having a concave face and a convex face,
   placing said semicylindrical piece and said body part together with the concave faces thereof toward one another,
   and welding said semicylindrical piece to said body part to provide a body shell having a cylindrical flow passageway.

2. The method of claim 1 wherein the side margins of said blank are trimmed off straight after the cylindrical flange has been formed but before the side flanges are formed.

3. The method of claim 1 wherein side flanges of said blank are formed just prior to the formation of said cylindrical flange.

4. The method of fabricating two valve body shells comprising:
   providing two flat, rectangular metal blanks of the same size, each having side and end edges,
   forming in each blank a circular opening located intermediate the ends of the blank and centrally between the side edges of said blank, wherein the openings are similarly located in both blanks,
   performing an operation on that marginal portion of each blank which surrounds and defines said opening, wherein said operation comprises pressing such marginal portion in a direction normal to the plane of said blank to provide a cylindrical flange,
   bending side marginal portions of each blank in the opposite direction away from the plane of said blank to form upstanding side flanges,
   joining said formed blanks together with the side flanges thereof in abutting relationship and with the cylindrical flanges extending away from each other,
   dividing the thus fabricated structure transversely through the center of said cylindrical flanges to provide two body parts each having a concave face at one end,
   providing for each body part a semicylindrical piece having a concave face and a convex face,
   placing one semicylindrical piece and one body part together with the concave faces thereof toward one another, and doing the same with the other semicylindrical piece and body part,
   and joining each semicylindrical piece to its body part to provide a cylindrical flow passageway for each body part.

5. The method of fabricating a body shell of a gate valve of the type having a narrow flat chest portion within which a gate blade moves,
   and wherein there are tubular flow passage portions extending away from the chest portion in opposite directions,
   said method comprising providing a flat, rectangular metal blank having side and end edges,
   forming a circular opening in said blank intermediate the ends of the blank wherein the opening is located centrally between the side edges of said blank,
   performing an operation on the marginal portion of said blank which surrounds and defines said opening, wherein said operation comprises pressing such marginal portion in a direction normal to the plane of said blank to provide a cylindrical flange,
   bending side marginal portions of said blank in the opposite direction away from the plane of said blank to form straight upstanding side flanges, said bent blank constituting two body halves meeting at a plane bisecting said circular flange, constructing from one or more bent blanks a body part wherein two body halves are welded together and wherein the halves are provided by dividing one or more bent blanks formed as above described, it being immaterial whether one bent blank is divided and the halves welded together, or whether two bent blanks are welded together and then divided, providing a semicylindrical piece having a concave face and a convex face, placing said semicylindrical piece and said body part together with the concave faces thereof toward one another, and welding said semicylindrical piece to said body part to provide a body shell having a cylindrical flow passageway.

References Cited

UNITED STATES PATENTS 3,066,631  12/1962  Geary _____ 29—157.1 X
3,224,729  12/1965  Beurel _____ 251—329 X ARNOLD ROSENTHAL, *Primary Examiner.*

U.S. Cl. X.R.

29—463; 113—116; 251—329